United States Patent
Mori

(10) Patent No.: US 7,839,925 B2
(45) Date of Patent: Nov. 23, 2010

(54) APPARATUS FOR RECEIVING PACKET STREAM

(75) Inventor: Hirofumi Mori, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1639 days.

(21) Appl. No.: 11/092,164

(22) Filed: Mar. 28, 2005

(65) Prior Publication Data

US 2006/0215711 A1 Sep. 28, 2006

(30) Foreign Application Priority Data

Mar. 24, 2005 (JP) .............................. 2005-085143

(51) Int. Cl.
*H04N 7/12* (2006.01)
(52) U.S. Cl. ................... 375/240.01; 714/776; 714/779
(58) Field of Classification Search ............ 375/240.01; 714/776, 779
See application file for complete search history.

(56) References Cited

U.S. PATENT DOCUMENTS

| | | | | |
|---|---|---|---|---|
| 5,991,912 A | * | 11/1999 | Mao ............................ | 714/776 |
| 2001/0036355 A1 | * | 11/2001 | Kelly et al. .................... | 386/52 |
| 2003/0009722 A1 | * | 1/2003 | Sugiyama et al. ........... | 714/779 |
| 2006/0080094 A1 | | 4/2006 | Katayama et al. | |

FOREIGN PATENT DOCUMENTS

WO WO 2004/077406 A1 9/2004

OTHER PUBLICATIONS

Article entitled Overview of the H.264/AVC Video Coding Standard, pp. 560-576, Thomas Wiegand, published in the IEEE Transactions on Circuits and Systems for Video Technology, vol. 13, No. 7, Jul. 2003.
Wenger, et al, "RTP Payload Format for H.264 Video; rfc3984.txt", IETF Standard, Internet Engineering Task Force, IETF, CH, Feb. 1, 2005, pp. 3-14 and 27-33, XP015009755.
Hannuksela, M., et al "Description of 1-8 NAL", Video Standards and Drafts, XX, XX, No. JVT-C164, May 10, 2002, pp. 2-4, XP030005275.
European Search Report dated Aug. 21, 2008, issued in a counterpart European Application.

* cited by examiner

*Primary Examiner*—Tung Vo
*Assistant Examiner*—Anner Holder
(74) *Attorney, Agent, or Firm*—Holtz, Holtz, Goodman & Chick, PC

(57) ABSTRACT

In the packet stream receiver, transport streams are sequentially input, discontinuity of continuity counters described in packet headers of transport stream packets in the stream is detected and a loss of a transport stream packet is determined. A terminator is added to part of NAL units extracted from a packet immediately before the transport stream packet is lost, and data on NAL units up to a NAL unit whose start code is detected is discarded after the start code of the NAL unit contained in the transport stream packet is detected and a terminator is added thereto. Thus, a packet stream receiver can obtain appropriate data even when part of packets is lost during transmission.

17 Claims, 7 Drawing Sheets

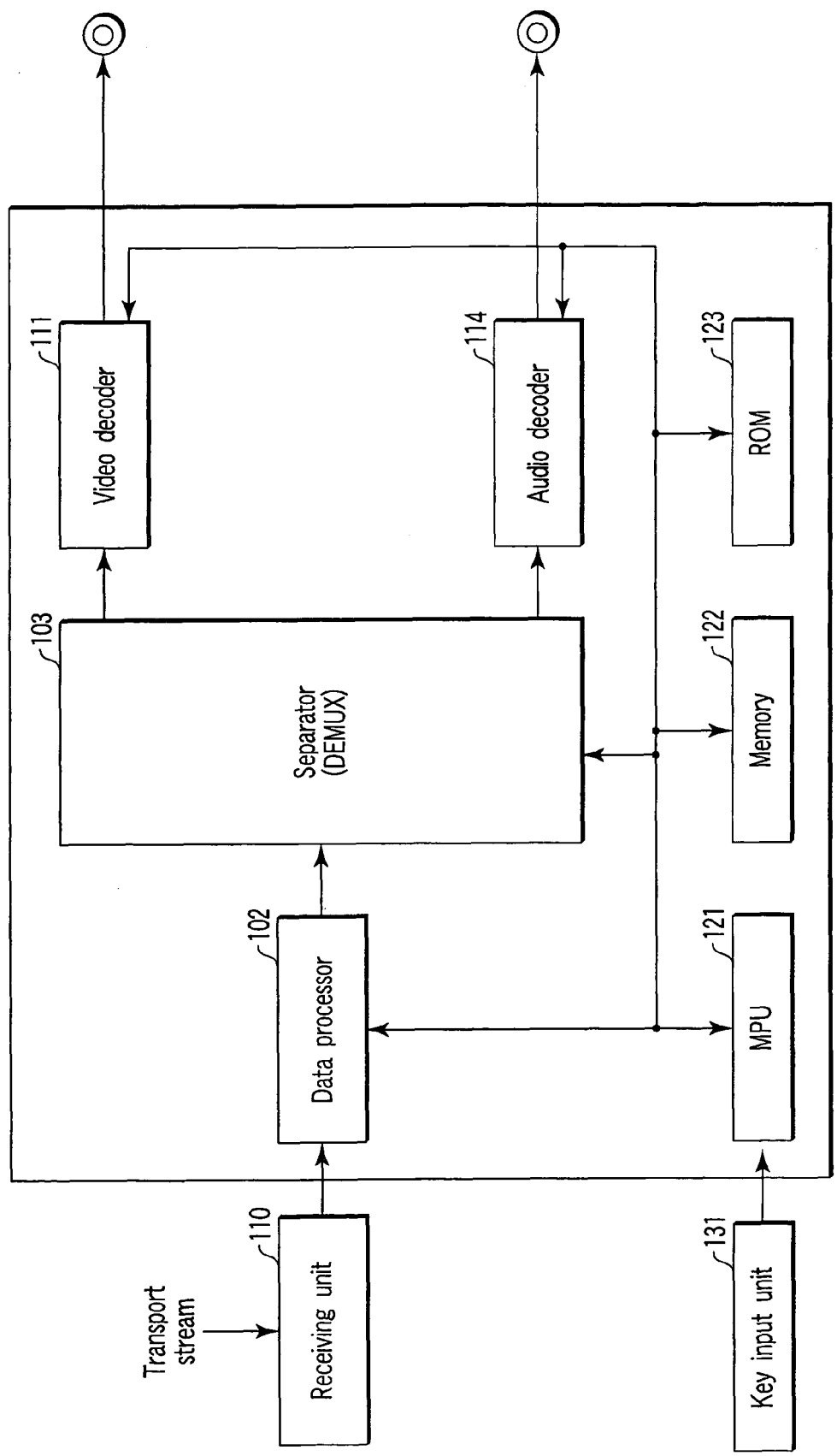
F I G. 1

APPARATUS FOR RECEIVING PACKET STREAM

CROSS-REFERENCE TO RELATED APPLICATIONS

This application is based upon and claims the benefit of priority from prior Japanese Patent Application No. 2005-085143, filed Mar. 24, 2005, the entire contents of which are incorporated herein by reference.

BACKGROUND OF THE INVENTION

1. Field of the Invention

The present invention relates to an apparatus for receiving packet stream, and particularly to a packet stream receiver capable of receiving a packet stream and making it to optimized data.

2. Description of the Related Art

An encoding/decoding technique for video medium such as a moving picture and audio mediums has been increasingly developed in recent years. This is because moving pictures with high quality have been developed and the amount of information has increased, and further because a wired or radio network has been developed and a desire for transmitting picture information through the network has been increased.

The encoding/decoding technique for moving picture requires high compression efficiency, high quality in decoding, and good transmission efficiency, because the moving picture has remarkably information size. There is a technique called H.264/AVC (Advanced video coding), which is recognized as the international standard of the encoding/decoding technique for moving picture which satisfies these desires (hereinafter, simply denoted as H.264), and this encoding/decoding technique for moving picture is disclosed in, for example, for example, IEEE TRANSACTION ON CIRCUIT AND SYSTEMS FOR VIDEO TECHNOLOGY, VOL. 13, No. 7, 2003, "Overview of the H.264/AVC Video Coding Standard", Thomas Wiegand.

Also in a mobile digital broadcasting of ISBT-T (Integrated Service Digital Broadcasting-Terrestrical), H.264/AVC (Advanced video coding) standard is employed for a moving picture encoding method, MPEG-2 standard or AAC (Advanced-Audio-Coding) standard is also employed for an audio encoding method. In the encoding methods, encoding stream is multiplexed on packets of a transport stream (TS stream) and the transport stream (TS stream) is transmitted. In such transport stream (TS stream) transmission, if an error occurs during transmission and part of packets is lost, that is, if packet loss occurs, discontinuity occurs in an elementary stream (ES stream) extracted from the transport stream (TS stream). Since a decoder at a reception side does not detect a discontinuity and continuously decodes the ES stream, video and audio data is erroneously interpreted.

If the ES stream corresponds to H.264 stream, a picture quality is degraded due to the erroneous interpretation. If the ES stream corresponds to AAC stream, noise, i.e., abnormal noise is also produced due to the erroneous interpretation.

As described above, the erroneous interpretation on the video or audio data causes the video or audio data to generate erroneous decoded picture or audio different from normal picture or audio inherent in the video or audio data so that a picture or audio quality is remarkably degraded.

In general, the decoder can detect an occurrence of error, only when a syntax error is occurred. However, in a method of small redundancy encoding type, there is produced a large span between an error generating point and an error detection point so that degrade of a reproduction quality is relatively large.

Similarly, also in streaming using RTP (Real Time Protocol), there is a similar problem that part of packets is lost and data is degraded due to an erroneous interpretation.

BRIEF SUMMARY OF THE INVENTION

An object of the present invention is to provide an apparatus fore receiving a packet stream, which can optimize a part of packet data received in packet even when packet or packets are lost during transmission.

According to the present invention, there is provided an apparatus for receiving a transport packet. stream, comprising:

an input unit configured to sequentially inputs transport stream packets constituting the transport packet stream;

a determining unit configured to detect discontinuity of continuity counters described in packet headers of the transport stream packets and determine a loss of a transport stream packet;

a termination processor configured to add a terminator to part of an elementary stream extracted from a transport stream packet immediately before the transport stream packet is lost; and a detection processor configured to detect a synchronize point of the elementary stream after adding the terminator, and discard data of another part of elementary stream between the terminator and the synchronize point of the elementary steam.

Further, according to the present invention, there is provided an apparatus for receiving a RTP packet stream, comprising:

an input unit configured to sequentially input RTP packets each included in the RTP packet stream and having a RTP packet header and a payload;

a discriminating unit configured to discriminate, from an identifier contained in the payload, that the RTP packet is a segmentation unit packet;

a determining unit configured to detect continuity of sequence numbers contained in the RTP packet header, and when the numbers are discontinuous and the identifier is a segmentation unit packet, determines that the RTP packet is lost;

a termination processor configured to add terminators to a part of elementary stream extracted from a packet immediately before the loss RTP packet; and a detection processor configured to detect a synchronize point of the elementary stream after adding the terminator, and discards data of an another part of the elementary stream between the terminator and the synchronize point of the elementary steam.

BRIEF DESCRIPTION OF THE SEVERAL VIEWS OF THE DRAWING

FIG. 1 is a block diagram schematically showing a reproducing apparatus for receiving and decoding a transport stream according to one embodiment of the present invention;

DETAILED DESCRIPTION OF THE INVENTION

Hereinafter, an apparatus for receiving a packet stream and optimizing data transmitted in this packet stream according to one embodiment of the present invention will be described with reference to the drawings.

Figure 2:
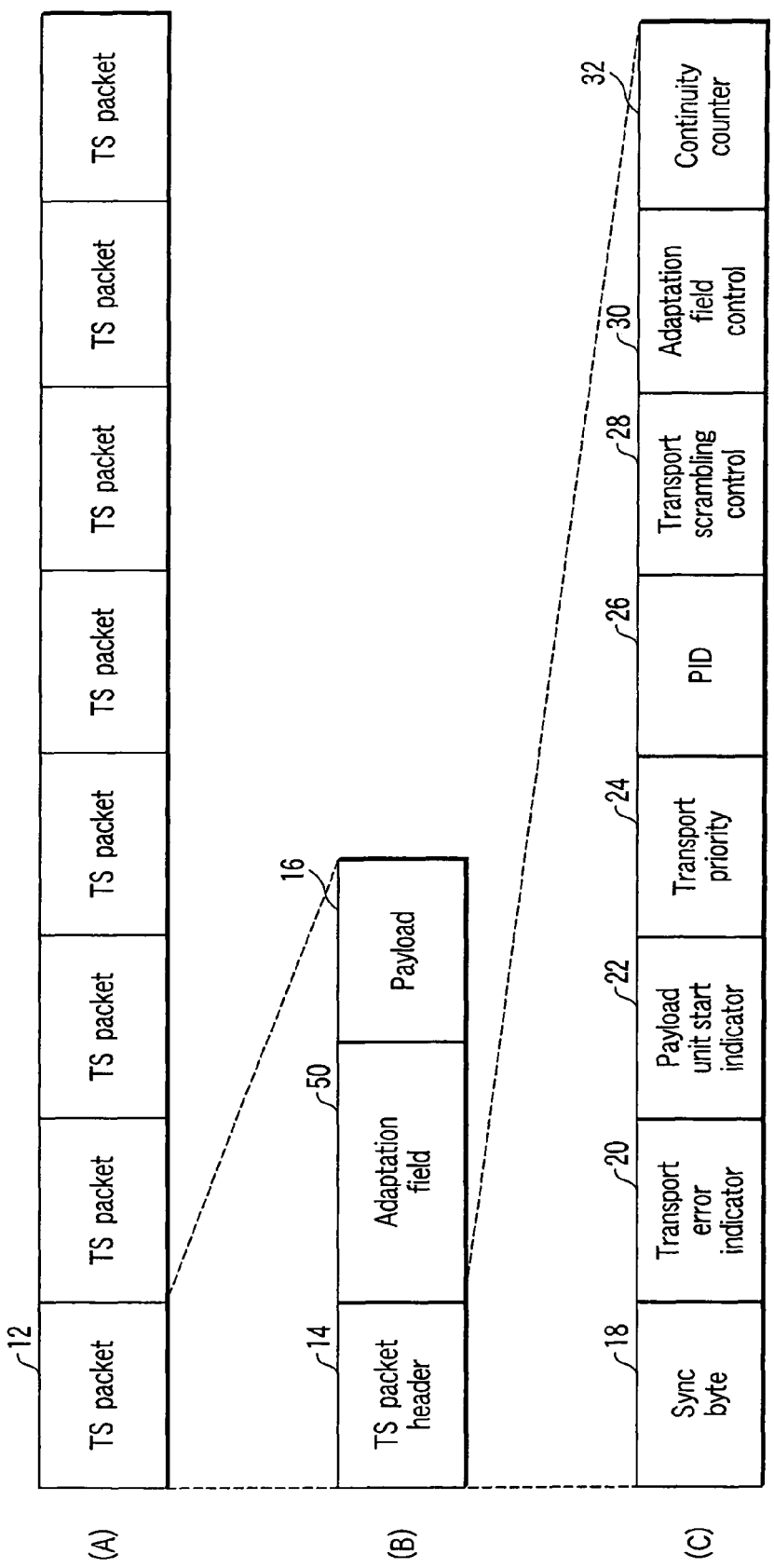
FIG. 2 is a schematic diagram showing a data structure of a transport stream (TS) to be transmitted to the apparatus shown in FIG. 1.
Figure 3:
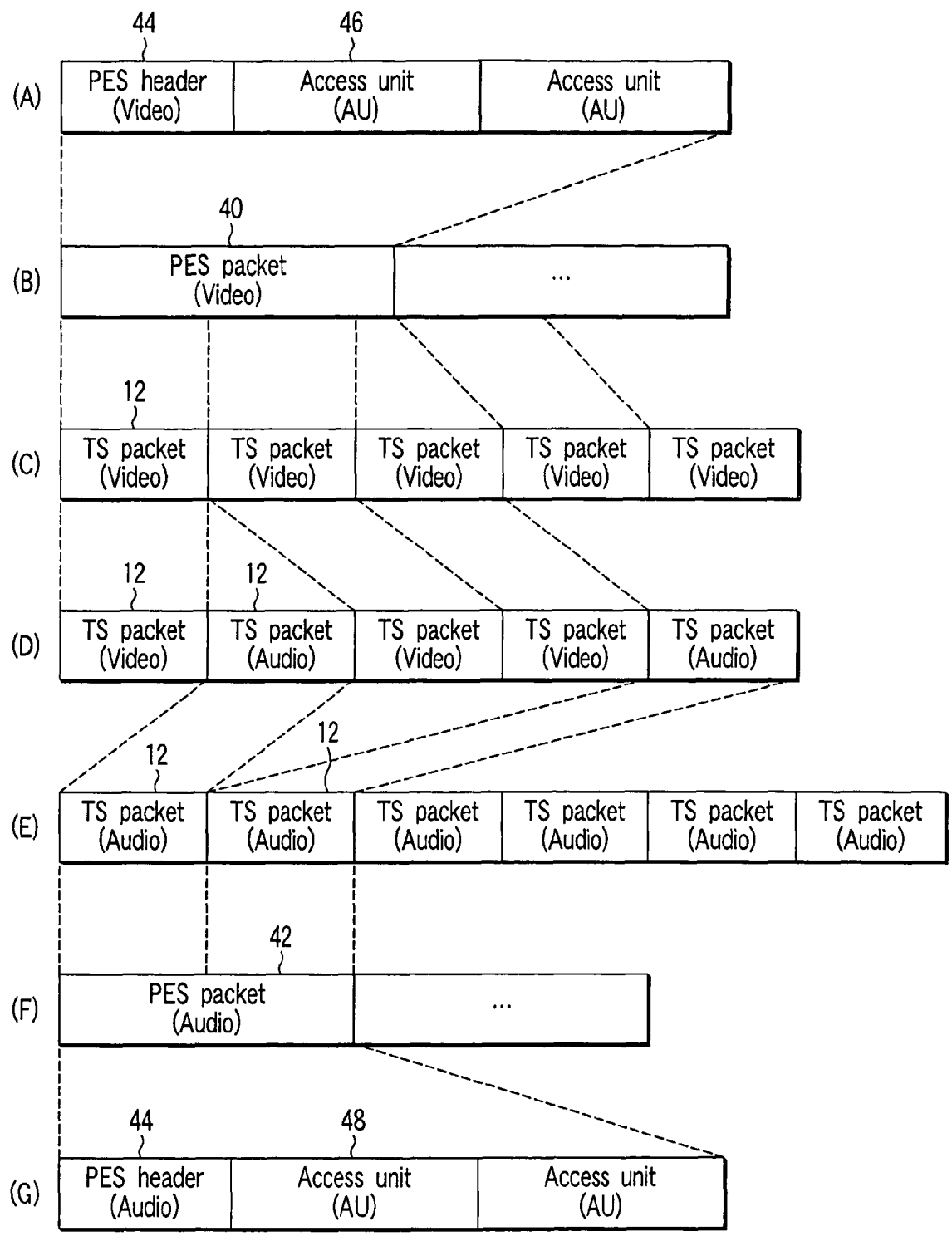
FIG. 3 is a schematic diagram showing a structure of a packetlized elementary stream (PES) which is generated from packets of the transport stream shown in FIG. 2.
Figure 4:
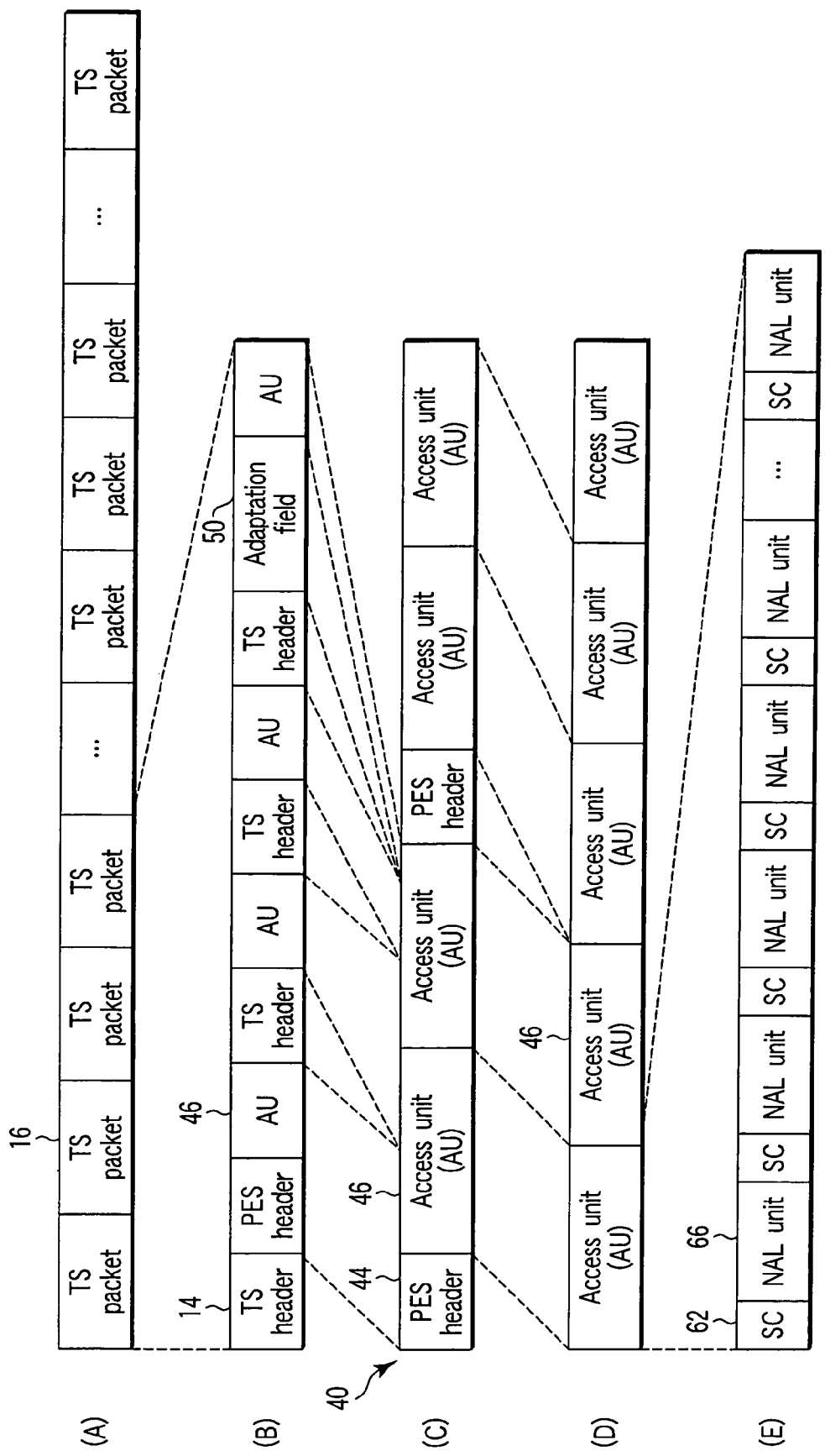
FIG. 4 is schematic diagrams showing a relationship between the transport stream shown in FIG. 2, the packetlized elementary stream (PES) shown in FIG. 3, and a H.264 byte stream.

FIG. 1 is a block diagram showing an apparatus which receives a transport stream and reproduces picture and audio data transmitted by this transport stream (TS) according to one embodiment of the present invention. FIG. 2 shows the structure of this transport stream received in the apparatus shown in FIG. 1, FIG. 3 shows the structure of a packetized elementary stream (PES) constituted of the TS packets extracted from the transport stream shown in FIG. 2, and FIG. 4 shows a relationship among the TS packets shown in FIG. 2, the PES packet shown in FIG. 3, and a byte stream prescribed by H.264/AVC.

The structure of the apparatus, i.e., receiver will be described with reference to FIG. 1, and the data structure of a transport stream will be described with reference to FIG. 2 to FIG. 4.

In the apparatus shown in FIG. 1, a transport stream prescribed in MPEG2 is transmitted from a transmitting unit (not shown) and this transport stream is received in a receiving unit 110. The transport stream (TS) is constituted of a collection of TS packets 12 each having 188 bytes as shown in FIG. 2(A), and the TS packets 12 are sequentially input into the receiving unit 110. Each TS packet 12 is constituted of a TS packet header 14 having 4 bytes, an adaptation field 50 having a variable length byte of 0 to 184 bytes, and TS packet data (payload) 16 having remaining bytes as shown in FIG. 2(B). This TS packet 12 is transmitted to a data processor 102 shown in FIG. 1 and the TS packet header 14 thereof is extracted and a packetlized elementary stream (PES) is constituted of the TS packet data (payload) 16.

As shown in FIG. 2(C), a synchronization byte (sync byte) 18 where a synchronization signal having 8 bits is described as prescribed in MPEG2, a transport error indicator 20 which indicates the presence of a bit error in the packet, and a payload unit start indicator 22 which indicates that the PES packet shown in FIG. 4(C) starts from the payload indicating the TS packet data 16 are described in the TS packet header 14. The synchronization byte (sync byte) 18 is detected in the data processor 102 so that a header of the transport stream packet (TS) 12 is detected. The payload unit start indicator 22 is detected so that the data processor 102 can extract the payload constituting the PES packet, that is, the TS packet data 16. Further, the transport error indicator 20 is detected, thereby detecting, at the reception side, that an error has been occurred into the transport stream packet (TS) 16 during transmission.

The TS packet header 14 is constituted of a transport priority 24 which indicates the degree of importance of the packet, a PID (Packet Identification: packet identifier) 26 which indicates an attribute of an individual stream of the packet, a transport scrambling control 28 which indicates the presence of scramble of the packet and a type thereof, an adaptation field control 30 which indicates the presence of adaptation field and the presence of payload, and a continuity counter 32 which indicates information for detecting whether or not part of packets having the same PID is lost during transmission. The data processor 102 can detect, in the PID (Packet Identification: packet identifier) 26, the payload of the TS packet 12, that is, whether the TS packet data is video or audio, and can specify the attribute of the PES packet constituted of the TS packets 12. The data processor 12 can verify a count value indicated by the continuity counter 32 to discriminate whether or not the TS packet 12 has been lost during transmission as described later in detail. Here, in the continuity counter 32, the TS packets 12 having the same PID have added thereto count values (0, 1, 2, . . . , F, 0, 1, 2) cycling in TS packet generating order.

The TS packet data (payload) 16 shown in FIG. 2(B) constitutes the packetlized elementary stream (PES) for each medium, i.e., a video packetlized elementary stream or an audio packetlized elementary stream, as shown in FIG. 3(B) or FIG. 3(F), and constitutes PES packet 40, 42 shown in FIG. 3(B) or FIG. 3(F) each time the payload unit start indicator 22 is detected. In other words, the PES packet 40, 42 is constituted of one or several TS packets 12 as shown in FIG. 3(C), FIG. 3(D) and FIG. 3(E), and the packetlized elementary stream (PES) is constituted such that several PES packets 40 are sequentially arranged, and one PES packet 40, 42 is constituted of the TS packets 12 from the TS packet 12 including the payload unit start indicator 22 to the TS packet 12 precedent to the TS packet 12 including the next payload unit start indicator 22. The packetlized elementary stream (PES) is constituted by multiplexing the PES packet 40 whose payload is video data and the PES packet 42 whose payload is audio data. The data processor 102 supplies the video PES packet 40 and the audio PES packet 42 both of which are constituted of the TS packet data 16 according to the payload unit start indicator 22 to a demultiplexer 103 (DEMUX). Here, the PES packets 41 and 42 are fixed in variable byte.

As shown in FIG. 3(A) and FIG. 3(B), the video PES packet 40 is constituted of one or several access units (AU) 46 as payload subsequently to a PES header 44, and these access units (AU) 46 constitute a byte stream prescribed in H/264, MPE-2, or MPEG-4. As shown in FIG. 3(F) and FIG. 3(G), the audio PES packet 42 is similarly constituted of one or several access units (AU) 48 as audio payload subsequently to the PES header 44. This audio payload stores audio data encoded by various encoding schemes, that is, AC3 audio data, PCM audio data, and MPEG audio data therein. A stream ID as an attribute identifier which indicates that the payload of the PES packet 40 is audio or video is described in the PES header 44, which enables to discriminate the PES packet 40.

The demultiplexer 103 (DEMUX) supplies the audio payload to the audio decoder 114 in accordance with the PID (Packet Identification: packet identifier) 26, and supplies the access unit (AU) 46 to the H.264 video decoder 111. Therefore, in the H.264 video decoder 111, NALs in the access unit (AU) 46 are decoded into a picture to be output as a video signal for each frame in units of the access unit (AU) 46.

Similarly, in the audio decoder 114, the audio payload is decoded to be output as an audio signal according to the audio payload encoding method.

The data processor 102, the demultiplexer 103, the video decoder 111, and the audio decoder 114 shown in FIG. 1 are controlled by a MPU 121 and a memory 122 according to a processing program stored in a ROM 123. A key input unit 131 as a user interface is connected to the MPU 121 so that video and audio reproduction can be controlled also according to the input from the key input unit 131.

As described above, the transport stream TS is constituted of consecutive TS packets 16 as shown in FIG. 4(A), and each packet 40 is constituted of the TS header 14 and the TS payload 16 as shown in FIG. 4(B). One or several TS packets 16 constituting the PES packet 40 store the PES header 44 and several AUs 46 in the payload thereof as shown in FIG. 4(B). One PES packet 40 is constituted of one or several TS packets 16 each having 188 bytes, and is provided with an adaptation field 50 to be data-aligned as needed such that one or several AUs 46 are contained therein.

In the data processor 102, the TS header 14 is removed from one or several TS packets 16 as shown in FIG. 4(C) to constitute the PES packet 40. The example in FIG. 4(C) shows that two of AUs 46 is stored in the payload 46 of one PES packet 40 and the two of AUs 46 are extracted from four TS packets 16. Since the adaptation field 50 is inserted into the TS packet 16 for data alignment, it is discarded when constituting the PES packet 40.

In the demultiplexer 103, the PES header 44 in the PES packet 40 is removed and the AUs 46 are sequentially transmitted to the video decoder 111 and are decoded. FIG. 4(D) shows a byte stream which is constituted of the AUs 46 extracted from the PES packets 40 and decoded in the video decoder 111. In the video decoder 111, a start code (SC) 62 which corresponds to a synchronizing point in the AU is detected to extract NAL units 66 constituting the AU 46 as shown in FIG. 4(E), and a picture constituted in units of the AU 46, for example, a picture frame is generated from this NAL units 66. In H.264, macro blocks are constituted according to information of several NAL units 66 and one picture is displayed.

Next, an operation of the receiver shown in FIG. 1 will be described with reference to FIG. 5, if a TS packet is lost while transmitting the transport stream TS which corresponds to multiplexed H.264 streams.

As is clear from FIG. 4(B) and FIG. 4(C), one AU 46 or part of AU 46 is stored in one TS packet 16 stores therein as the payload 46 and one or several NAL units 66 and part of the NAL units 66 corresponding to the AUs 46. Therefore, when one TS packet 16 is lost while transmitting the transport stream TS, one or several NAL units 66 and/or part of the NAL units 66 would be lost. Alternatively, the start code (SC) 62 corresponding to the lost NAL unit may be also lost. When this TS packet 16 is lost, only part of the NAL units 16 remains in correspondence to the lost TS packet 16, and other part are lost, and part of the NAL units succeeding to this NAL unit 66 would be similarly lost and other part would be lost. When the NAL units 16 are sequentially supplied to the H.264 video decoder 111, part of the NAL units 16 in a byte stream is coupled to the remaining of other NAL units 16 in the H.264 video decoder 111. Since the H.264 video decoder 111 can not detect a discontinuous point coupling the part of the NAL units 16 to the remaining of other NAL units 16, the H.264 video decoder lll erroneously interprets the data of the coupled NAL units to reproduce an picture so that noise is appears in the picture due to an error.

Figure 5:
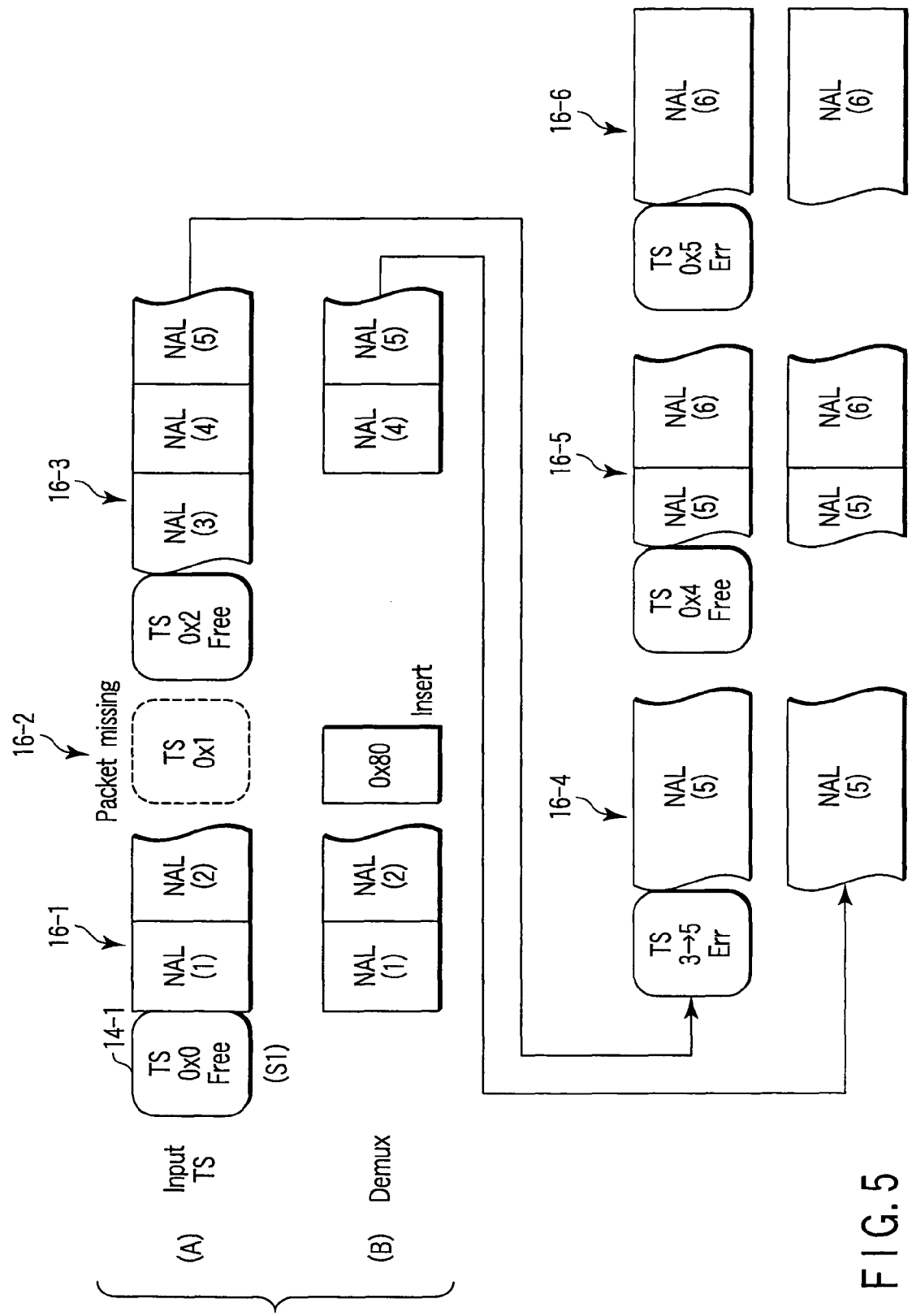
FIG. 5 is a schematic diagram showing a packet header and a H.264 byte stream in a co-existing manner for explaining a case where a packet is lost in a transport stream (TS) to be transmitted to the apparatus shown in FIG. 1, and a schematic diagram showing a byte stream to be transmitted to a decoder, respectively.

FIG. 5(A) shows a data structure for conveniently explaining one example where the TS packet 16 is lost while transmitting the transport stream (TS). As shown in FIG. 5(A), the transport error indicator 20 of the TS header 14 is detected in the data processor 102, thereby determining whether or not an error is occurred in the TS packet 16. In FIG. 5, when an error is occurred in the TS packet 16, "Err" is indicated in the TS packet header 14, and when an error is not occurred in the TS packet 16, "Free" is indicated in the TS packet header 14. The continuity counter 32 of the TS packet header 14 describes therein counter values(0×0, 0×1, 0×2, . . .) which are updated in TS packet transmitting order.

When the receiving unit 110 starts to receive the transport stream 16 at a certain timing and a certain transport stream packet 16-1 is transmitted to the data processor 102, the data processor 102 detects. "Free" indicating that an error is not occurred from the transport error indicator 20 of the header 14 of the transport stream packet 16-1 and the count value "0×0" from the continuity counter 32. When part of the NAL unit (1) 66 and the NAL unit (2) 66 has been transmitted to the transport stream packet 16-1, part of the NAL unit (1) 66 and the NAL unit (2) 16 is transmitted to the video decoder 111 via the demultiplexer 103. When packet loss has occurred in the transport stream packet 16-2 in the transport stream (TS) during transmission, the next transport stream packet 16-2 is not received in the receiving unit 110 and the further next transport stream packet 16-3 is input into the receiving unit 110. When the remaining of the NAL unit (2) 66 and part of the NAL units (3) are stored in the packet loss transport stream packet 16-2, the remaining of the NAL unit (2) 66 and the NAL unit (3) 66 would be lost during transmission. When the transport stream packet 16-3 is transmitted to the data processor 102, the data processor 102 detects the count value "0×2" from the continuity counter 32. Therefore, since the data processor 102 detects not the count value "0×1" but the count value "0×2", the data processor 102 detects that the transport stream packet 16-2 has been lost during transmission. Thus, since an error occurs when the remaining of the NAL unit (3) 66 at the start of the transport stream packet 16-3 is transmitted to the video decoder 111 via the demultiplexer 103, a processing of discarding the remaining of this NAL unit (3) 66 is performed. When the remaining of the NAL unit (2) 66 is transmitted to the vide decoder 111 as shown in FIG. 5(B) along with the discarding of the remaining of this NAL unit (3) 66, data in the remaining of the NAL unit (2) 66 may be so treated that the remaining data is terminated at byte unit, a terminator "0×80" indicating the termination of the NAL unit may be inserted subsequently to part of the NAL unit (2) 66, and may be transmitted to the vide decoder 111. Therefore, the vide decoder 111 forms a picture with the already input other NAL units 66 and the remaining of the NAL unit (1) 66 and the NAL unit (2) 66. Thus, as one example, a display unit (not shown) displays that macro blocks of the picture frame looks lost. Further, the display unit (not shown) displays a picture where a normal macro blocks and a replaced macro blocks are combined, where lost macro blocks is replaced with other approximated macro blocks already decoded.

The NAL unit (3) 66 precedent to the discarded NAL unit (3) 66 in the transport stream packet 16-3 is detected at the star code (SC) of the header thereof and is transmitted to the video decoder 111.

Figure 6:
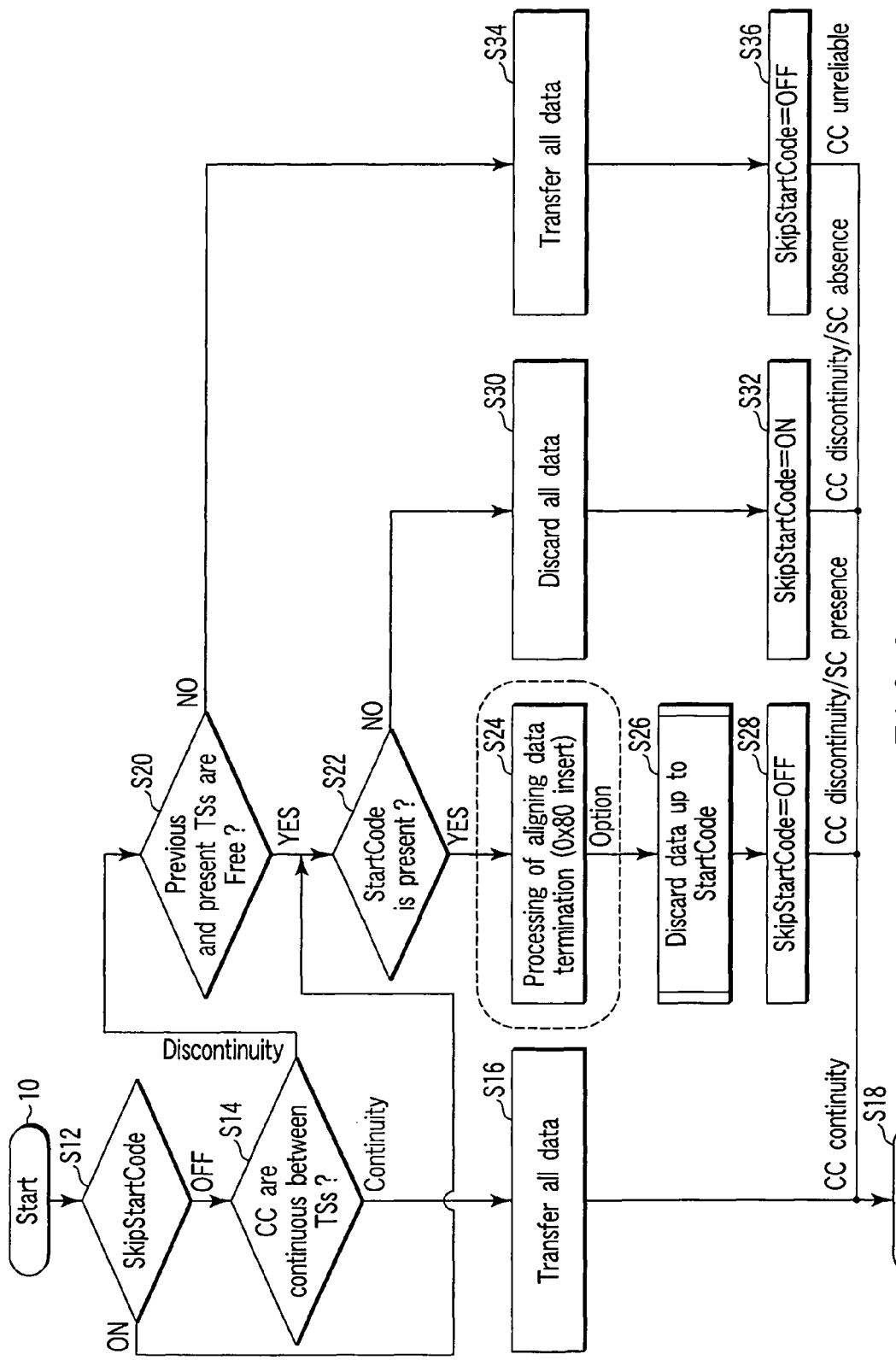
FIG. 6 is a flow chart showing a processing of transport stream in a data processor shown in FIG. 1.

A transport stream processing shown in FIG. 5(A) and FIG. 5(B) will be described in more detail with reference to FIG. 6. When the processing is started as shown in step S10, the data processor 102 confirms whether or not an operation of detecting the start code (SC) 62 is ON. In step S12, an OFF operation of not detecting the start code (SC) 62 is set, in step S14, it is confirmed whether or not the values of the continuity counter (CC) 32 are continuous in the transport stream (TS). For example, it is conformed that the count value has been updated from the count value (0×4) to the count value (0×5) in the TS packets 16-5 and 16-6 as shown in FIG. 5(A). When the count values (0×0, 0×1, 0×2, . . .) are continuous, it is determined that packet loss has not occurred, and the processing of corresponding all the data of the transport stream (TS) to the transport stream (TS) in the video decoder is terminated as shown in step S16.

In step S12, when the operation of detecting the start code (SC) 62 is ON, in step S22, the presence of the start code (SC) 62 is confirmed. When the start code (SC) is not detected, in step S30, all the data of the transport stream (TS) is discarded. As shown in step S32, it is determined that the values of the continuity counter (CC) 32 are discontinuous and the start code (SC) 62 is not present, and the processing is terminated for the transport stream (TS) while the operation of detecting the start code (SC) 62 is being ON so that the processing of the next transport stream (TS) is waited.

In step S14, when the start code (SC) 62 is discontinuous, in step S20, it is confirmed that an error is not present in this TS packet 16 and the TS packet 16 immediately before this TS packet 16. Specifically, it is confirmed that "Free" is described in the transport error indicators 20 of this TS packet 16 and the TS packet 16 immediately before this TS packet. When "Free" is not described in the transport error indicator 20 and the "Err" is described in one of this TS packet 16 and the TS packet 16 immediately before this TS packet 16, the values of the continuity counter (CC) 32 are not reliable and the processing for packet loss cannot be performed. Therefore, all the data of the transport stream (TS) is transferred to perform the picture display processing while the processing for packet loss is not performed, and the processing proceeds to the processing for the next transport stream (TS) while the processing of detecting the start code (SC) is being OFF. In step S20, the case of No corresponds to the processing in the case of transition from the TS packet 16-3 to the TS packet 16-4, the case of transition from the TS packet 16-4 to the TS packet 16-5, or the case of transition from the TS packet 16-5 to the TS packet 16-6.

In step S20, when it is confirmed that "Free" is described in the transport error indicators 20 of this TS packet 16 and the TS packet 16 immediately before this TS packet, the processing proceeds to step S22. Though "Free" is described in both the transport error indicators 20 of the TS packets 16-1 and 16-3 and packet loss of the TS packet 16-2 occurs there between, since the TS packets 16-1 and 16-3 are continuously input into the data processor 102, this fact corresponds to YES in step S20. In step S22, it is confirmed, as described above, whether or not the start code (SC) is present. When the start code (SC) is present, the termination processing of inserting the terminator "0×80" indicating the termination of the NAL unit into part of the NAL unit (2) 66 is performed as shown in step S24, and the remaining of the NAL unit (3) is discarded and the next start code (SC) is detected to supply the NAL unit (4) starting with this start code (SC) to the decoder 111 as shown in step S26. Thereafter, the detection of the start code (SC) is made OFF and the processing returns to step S12 again.

In the above explanation, there is configured a picture of NAL units after the start code which is detected by discarding the data up to the next start code in step S26 after the data termination is aligned in step S24. However, there may be configured a picture utilizing NAL unit having no error in the NAL type and NILL units succeeding thereto by discarding the data of the NAL units up to the start code having no error in the NAL type contained in the NAL unit. When the NAL unit having the start code to be detected next is a filler NAL unit, data on this filler NAL unit is discarded so that a picture may be configured by utilizing the NAL units other than the filler NAL unit and the NAL units succeeding thereto. Further, when the NAL unit whose start code is detected next does not follow the random access point in step S26, a picture may not be configured until the NAL units are sequentially discarded and the NAL units constituting IDR-AU (Instantaneous Decoding Refresh Access Unit) are detected. The NAL unit including IDR (Instantaneous Decoding Refresh) is a randomly accessible NAL unit and this NAL unit can be used to display a completed picture so that a flag "1" is described in the random access indicator described in the adaptation field control 30 shown in FIG. 2(C). Thus, the TS headers are sequentially retrieved to confirm the adaptation field control 30 so that the NAL unit including IDR (Instantaneous Decoding Refresh) can be retrieved.

As described above, in the transport receiver according to one embodiment of the present invention, the demultiplexer (DEMUX) extracts the 4-bit continuity counter provided in the transport stream header in the transport stream (TS stream) to detect the start code (0×000001), and transfers the data succeeding to the start code (0×000001) to the video decoder. Thus, the continuity point of the data is always the start code (0×000001), and decoding can be performed without erroneous interpretation of discontinuous data. As a result, a relatively normal reproduction picture can be obtained without degraded picture quality which is produced on the erroneous interpretation.

In the above described embodiment, the transport stream corresponding to the multiplexed H.264 streams are described. However, this invention is not limited to the transport stream corresponding to the multiplexed H.264 streams, but also applies to the other packet stream which constitutes an elementary stream including encoding data and synchronous points and can be apply to various encoding method and various medium to be encoded.

Figure 7:
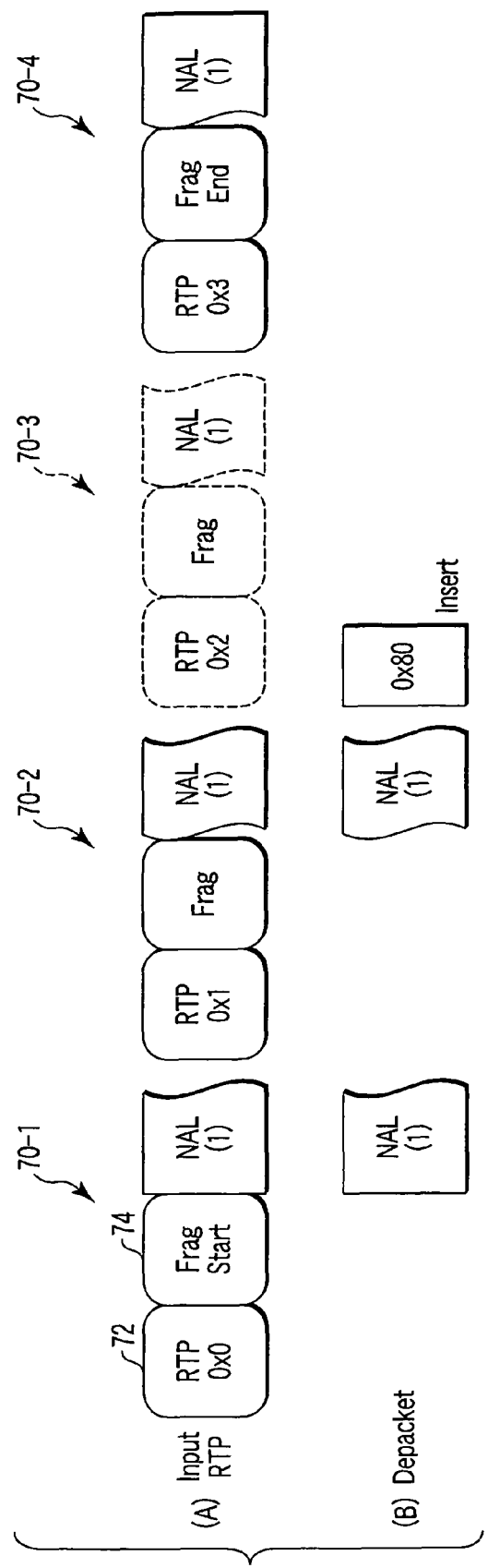
FIG. 7 is a schematic diagram showing RTP (Real Time Protocol) streaming to be transmitted to the apparatus shown in FIG. 1 and a schematic diagram showing a byte stream to be transmitted to the decoder, respectively.

As described above, it is possible to detect packet loss in the transport stream and to reproduce an appropriate reproduced picture, but the present invention is not limited to the transport stream and can be similarly applied to streaming transmission using RTP (Real Time Protocol). Detection of packet loss in the streaming transmission using RTP (Real Time Protocol) will be described with reference to FIG. 7.

In the streaming using RTP (Real time Protocol), RTP packets 70-1 to 70-4 are sequentially supplied to the receiving unit 110 as shown in FIG. 7(A). The RTP packet includes single NAL unit packet, aggregation packet, and fragmentation unit packet. An identifier for identifying the packet is described in a payload header 74 succeeding to a RTP packet header 72. Only one NAL unit is stored in the single NAL unit packet, several NAL units are stored in the aggregation packet, and part of NAL unit is stored in the fragmentation unit packet. Further, the single NAL unit packet and aggregation packet, and the NAL units therein are synchronized with each other. Therefore, even when the signal NAL unit packet or aggregation packet is lost during transmission, the NAL units are sequentially synchronized and supplied to the decoder 111 to be decoded. On the contrary, when the fragmentation unit packet is lost, the sequence numbers of the RTP headers are detected in step S14 in the processing similar to in FIG. 6, and when the numbers are discontinuous, it is determined that a packet has been lost. When a packet loss is present, the termination processing is performed for part of NAL units of the previous packet transmitted before the loss packet, and the terminator "0×80" is inserted therein similar as in step S24.

When the RTP packet 70-1 is input and the fragmentation unit packet is detected from the payload header 74 as shown in FIG. 7(A), it is confirmed whether or not the sequence numbers ("0×0", "0×1") are continuous. When the numbers are continuous, part of the NAL unit (1) is transmitted to the decoder 111. Since, when the RTP packet 70-3 is lost as shown in FIG. 7(A), the numbers are discontinuous from the sequence number ("0×1") to the sequence number ("0×3"), it is detected that the RTP packet 70-3 is lost. In this case, in the byte stream shown in FIG. 7(B), part of NAL unit (1) of RTP packets 70-1 and 7-2 transferred before the loss RTP packet 70-3 are supplied to the decoder 111, and remaining of NAL unit (1) of the RTP packet 70-4 after the loss RTP packet 70-3 is discarded and does not be supplied to the decoder 111. In this case, the terminator "0×080" may be inserted into the termination of part of the NAL unit (1) of the RTP packet 70-2 before the loss RTP packet 70-3 and is supplied to the decoder 111.

Therefore, the decoder 111 constitutes a picture with part of the NAL unit (1) supplied with no discontinuous point and displays a relatively normal reproduction picture without degraded picture quality which is produced on the erroneous interpretation.

As described above, the stream receiver according to the present invention can transfer the elementary stream having substantially no discontinuous data to the decoded even when part of packets is lost during transport stream transmission or in streaming using other RTP (Real Time Protocol).

What is claimed is:

1. An apparatus for receiving a transport packet stream, comprising:
an input unit configured to sequentially input transport stream packets constituting the transport packet stream, wherein each transport stream packet has a header which includes an error indicator indicating whether an error is contained in the transport stream packet;
a determining unit configured to detect discontinuity of continuity counters described in packet headers of the transport stream packets and determine a loss of a transport stream packet in the transport packet stream;
a termination processor configured to add a terminator to an end of a remaining part of an elementary stream extracted from a transport stream packet immediately before the transport stream packet is lost, if the error indicator indicates error absence;
a detection processor configured to detect a synchronize point of the elementary stream after adding the terminator, and discard data of the elementary stream between the terminator and the synchronize point of the elementary steam; and
a decoder which decodes the data of the elementary stream including no discarded data.

2. The apparatus according to claim 1, wherein the decoder includes a video decoder configured to decode the part of the elementary stream having the terminator into a picture.

3. The apparatus according to claim 1, wherein the detection processor discards the data of the elementary stream which includes no synchronize point.

4. The apparatus according to claim 1, wherein, when values of the continuity counters are discontinuous and the error indicator indicates error presence, the detection processor determines that an error is contained in the values of the continuity counters, and transfers the elementary stream contained in the transport stream packet.

5. The apparatus according to claim 1, wherein each of the packet headers has a payload, the payloads constituting the elementary stream in which PES packets are sequentially arranged, and each of the PES packets includes at least one access unit, and each access unit constitutes a bit stream including combinations of a start code and a NAL unit, wherein the start code acts as the synchronize point.

6. The apparatus according to claim 1, wherein the elementary stream includes combinations of a start code and a NAL unit, the end of the remaining part corresponds to an end of a remaining part of the NAL unit, and the termination processor adds the terminator to the end of the remaining part of the NAL unit, and the decoder decodes the NAL units and the remaining part of the NAL unit in the elementary stream.

7. The apparatus according to claim 1, wherein the detection processor discards the data of the part of the elementary stream if the detection processor detects the error indicator indicating that the transport stream is free of errors, and the detection processor discards no data of the part of the elementary stream and transports the data of the part of the elementary stream to the decoder if the detection processor detects the error indicator indicating that the transport stream includes an error.

8. An apparatus for receiving a transport packet stream, comprising:
an input unit configured to sequentially input transport stream packets constituting the transport packet stream, wherein each of the transport stream packets includes a packet header and a payload, the packet header includes a continuity counter and an error indicator which indicates whether an error is contained in the transport stream packet, the payloads include combinations of a start code and a NAL unit, and the start codes and the NAL units constitute an elementary stream;
a detecting unit configured to detect discontinuity of the continuity counters described in the packet headers to determine a loss of a transport stream packet in the transport packet stream;
a termination processor configured to detect the start codes, sequentially, and add a terminator to an end of a remaining part of the NAL unit extracted from a transport stream packet immediately before the transport stream packet is lost, if the error indicator indicates error absence;
a detection processor configured to discard data of the elementary stream between the terminator and next detection of the start code of the elementary stream; and
a decoder which decodes the NAL units and the remaining part of the NAL unit in the elementary stream including no discarded data.

9. The apparatus according to claim 8, wherein the decoder includes a video decoder configured to decode the remaining part of the NAL unit having the terminators into a picture.

10. The apparatus according to claim 8, wherein the detection processor continuously discards the NAL units in the elementary stream after the detection of the discontinuity of the continuity counters, if the termination processor detects no start code.

11. The apparatus according to claim 8, wherein, when values of the continuity counters are discontinuous and the error indicator indicates error presence, the detection processor determines that an error is contained in the values of the continuity counters, and transfers the elementary stream contained in the transport stream packet.

12. A method of receiving a packet stream, comprising:
receiving sequential inputs of transport stream packets constituting the transport packet stream;

detecting discontinuity of continuity counters described in packet headers of the transport stream packets and determining a loss of a transport stream packet in the transport packet stream;

detecting an error indicator which indicates whether an error is contained in the transport stream packet, and adding a terminator to an end of a remaining part of an elementary stream extracted from a transport stream packet immediately before the transport stream packet is lost, if the error indicator indicates error absence;

detecting a synchronize point of the elementary stream after adding the terminator, and discarding data of the elementary stream between the terminator and the synchronize point of the elementary stream; and decoding the data of the elementary stream including no discarded data.

13. The method according to claim 12, wherein the detecting of the synchronize point includes discarding the data of the elementary stream which includes no synchronize point.

14. The method according to claim 12, wherein the detecting of the synchronize point includes discarding the data of the elementary stream if an error indicator of the packet header indicating that the transport stream is free of errors is detected, and wherein the detecting of the synchronize point includes discarding no data of the elementary stream and transporting the data of the elementary stream if the error indicator indicating that the transport stream includes an error is detected.

15. A method of receiving a transport packet stream, comprising:

receiving sequential inputs of transport stream packets constituting the transport packet stream, wherein each of the transport stream packets includes a packet header and a payload, the packet header includes a continuity counter, the payloads include combinations of a start code and a NAL unit, and the start codes and the NAL units constitute the elementary stream;

detecting discontinuity of the continuity counters described in the packet headers to determine a loss of a transport stream packet in the transport packet stream;

detecting the start codes, sequentially, detecting an error indicator which indicates whether an error is contained in the transport stream packet, and adding a terminator to an end of a remaining part of the NAL unit extracted from a transport stream packet immediately before the transport stream packet is lost, if the error indicator indicates error absence;

discarding data of the elementary stream between the terminator and next detection of the start code of the elementary stream; and decoding the NAL units and the remaining part of the NAL unit in the elementary stream including no discarded data.

16. The method according to claim 15, wherein the discarding of the NAL units includes continuously discarding the NAL units in the elementary stream, if the termination processor detects no start code.

17. The method according to claim 15, wherein the discarding of the NAL units includes discarding the data of the elementary stream, if an error indicator of the packet header indicating that the transport stream is free of errors is detected, and the discarding of the part includes discarding no data of the elementary stream and transporting the data of the elementary stream, if the error indicator indicating that the transport stream includes an error is detected.

* * * * *